(12) United States Patent
Ricks

(10) Patent No.: US 6,404,188 B1
(45) Date of Patent: Jun. 11, 2002

(54) SINGLE GEARTOOTH SENSOR YIELDING MULTIPLE OUTPUT PULSE TRAINS

(75) Inventor: Lamar Floyd Ricks, Freeport, IL (US)

(73) Assignee: Honeywell INC, Morristown, NJ (US)

(*) Notice: Subject to any disclaimer, the term of this patent is extended or adjusted under 35 U.S.C. 154(b) by 0 days.

(21) Appl. No.: 09/267,728

(22) Filed: Mar. 15, 1999

Related U.S. Application Data

(60) Provisional application No. 60/078,606, filed on Mar. 19, 1998.

(51) Int. Cl.$^7$ ............... G01B 7/30; G01P 3/48; G01P 3/488; F02P 5/15; F02P 7/067
(52) U.S. Cl. ............ 324/207.22; 324/165; 324/166; 324/173; 324/207.25; 123/146.5 A; 123/406.58
(58) Field of Search ............... 324/163–166, 324/173, 174, 207.15–207.25; 123/406.58, 406.59, 476, 617, 146.5 A; 310/168; 341/15; 73/514.39; 702/145, 150, 151

(56) References Cited

U.S. PATENT DOCUMENTS

| | | | |
|---|---|---|---|
| 3,132,337 A | * | 5/1964 | Martin ............. 324/165 X |
| 3,247,456 A | * | 4/1966 | Dokter et al. ............. 324/174 |
| 4,072,893 A | * | 2/1978 | Huwyler ............. 324/207.25 |
| 4,121,112 A | * | 10/1978 | Hartig ............. 324/173 X |
| 4,142,153 A | * | 2/1979 | Smith ............. 324/165 |
| 4,405,896 A | * | 9/1983 | Akita ............. 324/173 X |
| 4,528,471 A | * | 7/1985 | Baumann ............. 310/168 X |
| 4,535,289 A | * | 8/1985 | Abe et al. ............. 324/207.22 X |
| 4,760,827 A | * | 8/1988 | Schreiber et al. ............. 324/173 X |
| 4,896,537 A | * | 1/1990 | Osborne ............. 324/207.22 X |
| 5,055,768 A | | 10/1991 | Plagens |
| 5,086,272 A | * | 2/1992 | Hinrichsen ............. 324/207.15 X |
| 5,119,166 A | | 6/1992 | Uppili |
| 5,121,289 A | | 6/1992 | Gagliardi |
| 5,122,756 A | | 6/1992 | Nelson |
| 5,140,262 A | | 8/1992 | Stolfus |
| 5,159,268 A | | 10/1992 | Wu |
| 5,166,548 A | | 11/1992 | Nelson |
| 5,184,590 A | * | 2/1993 | Hashimoto et al. ..... 123/406.58 |
| 5,304,926 A | | 4/1994 | Wu |
| 5,341,097 A | | 8/1994 | Wu |
| 5,444,370 A | | 8/1995 | Wu |
| 5,455,510 A | | 10/1995 | Nelson |
| 5,457,384 A | | 10/1995 | Alfors |
| 5,461,311 A | * | 10/1995 | Nakazato et al. ....... 324/207.24 |
| 5,469,054 A | | 11/1995 | Bicking |
| 5,469,055 A | | 11/1995 | Mueller et al. |
| 5,477,143 A | | 12/1995 | Wu |
| 5,488,294 A | | 1/1996 | Liddell et al. |
| 5,497,084 A | | 3/1996 | Bicking |
| 5,500,589 A | | 3/1996 | Sumcad |
| 5,670,886 A | * | 9/1997 | Wolff et al. ............. 324/165 X |
| 5,869,962 A | * | 2/1999 | Kasumi et al. ..... 324/207.25 X |

* cited by examiner

*Primary Examiner*—Gerard R. Strecker
(74) *Attorney, Agent, or Firm*—Andrew A. Areyta; Ronald W. Norris; Kevin L. Wildenstein

(57) ABSTRACT

A magnetic effect sensor system has a target with a first set of regularly spaced tooth/slot transition target features and a second set of different tooth/slot transition target features interspersed within the regularly spaced features. The mix of target features allows a single magnetic effect sensor to output a clocking pulse train for misfire detection and an encoded pulse train for determining absolute mechanical position by utilizing two thresholds on the sensor output waveform.

26 Claims, 3 Drawing Sheets

SINGLE GEARTOOTH SENSOR YIELDING MULTIPLE OUTPUT PULSE TRAINS

This invention claims priority from U.S. patent application Ser. No. 60/078,606, filed on Mar. 19, 1998.

BACKGROUND OF THE INVENTION

1. Field of the Invention:

The present invention relates generally to position sensing apparatus and more particularly to magnetic effect sensing apparatus including linear position sensing as well as the commonly known rotary position "geartooth sensors" wherein a magnetically sensitive device senses a ferrous object or objects generally projecting from a rotating target and resembling the teeth of a gear.

2. Discussion of the Related Art:

Various sensors are known in the magnetic effect sensing arts. Examples of common magnetic effect sensors may include Hall effect and magnetoresistive technologies. Generally described, these magnetic sensors will respond to the change of magnetic field as influenced by the presence or absence of a ferromagnetic target object of a designed shape passing by the sensory field of the magnetic effect sensor. The sensor will then give an electrical output which can be further modified as necessary by subsequent electronics to yield sensing and control information. The subsequent electronics may be either onboard or outboard of the sensor package per se. In the following explanation the ordinarily skilled artisan will appreciate that adjacent slot and tooth combinations, in whatever order, are necessary to produce the duty cycle required for an intelligible output pulse. Thus, a reference to "slot-to-tooth" may be deemed equivalent to "tooth-to-slot", and the obvious or equivalent inverse will not be stated in the text where the two would simply be inversions of each other.

For example, geartooth sensors are known in the automotive arts to provide information to an engine controller for efficient operation of the internal combustion engine. One such known arrangement involves the placing of a ferrous target wheel on the crank shaft of the engine with the sensor located proximate thereto. The target objects, or features, i.e. tooth and slot, are of course properly keyed to mechanical operation of engine components. The regularly spaced tooth-to-slot transitions yield a rhythmic, or regular, pulse pattern which determines the timing, or clocking., information necessary to run such functions of the engine as fuel injection and spark plug firing. But those targets designed exclusively with tooth-to-slot transitions at regular intervals and with slot-to-tooth transitions at regular intervals, i.e. regular tooth and slot features throughout the target circumference do not contain any information that would indicate absolute position of the target.

Typically therefore, feature, i.e. teeth and slot, widths are lengthened and/or shortened to yield a "signature" or coded pulse that can be distinguished as being different from the rest of the features, and this one signature pulse will yield information that will indicate absolute position of mechanical components, eg. of the engine. Determining the absolute engine position at start up is commonly referred to as "synchronization". To "synchronize" as quickly as possible, i.e. before a complete revolution of the target, additional "signature" pulse generating features must be added to yield information at more than one place on the target. This is the method by which the internal combustion engine controller determines the absolute position of the pistons within the cylinders, thereby yielding information that can be utilized at startup of the engine to "synchronize" its functions and increase engine efficiency and decrease fuel emissions.

However, by eliminating the regularity of teeth or slots to gain the encoded signal, the regular timing pulse is adversely affected. By creating irregular or missing elements within the timing sequence, less timing information is provided. Also, because the feature transitions are not regular, magnetic fringing effects which decrease the accuracy and repeatability of sensor output, can arise.

Another desired feature is to be able to detect direction of target movement. One known technique is to utilize a differential sensor which will yield a certain pulse train, or signal, when the target is rotated in one direction and the inversion of that signal when the target is rotated in the opposite direction; with a regular target with wide features of one type and narrow features of the other type, for example, wide slots and narrow teeth. When the target is spinning in one direction the digital output will be high a majority of the time and when the target is spinning in the opposite direction, the digital output will be low a majority of the time; hence duty cycle of the output can be used to determine the direction of target rotation. However, when utilizing this technique a regular type of target does not contain any information with regard to absolute position and will not allow for "synchronization".

To provide a constant pulse train for timing purposes and an encoded pulse train for absolute engine position and directional information during startup, one could use two sensors and two separate targets, however, this would increase the expense to the automotive manufacturer and is therefore undesirable.

Therefore, there exists a need for a target and sensor system which allows the user the ability to determine both regular timing pulses and direction of target movement very quickly without sacrificing "synchronization" performance, while being economical to use

SUMMARY OF THE INVENTION

It is an object of the present invention is to provide more information from a single sensing apparatus while utilizing the same target footprint.

It is another object of the present invention to provide a timing pulse train, and an encoded pulse train for determination of engine position, by applying multiple thresholds to the output of a single sensor which is detecting a target, or targets, designed to have multiple topographies without sacrifice of the constant, or regular timing pulses.

It is a further object of the present invention to provide a method and apparatus whereby a constant timing pulse and a variable encoded pulse may be gained from a single target by utilizing multiple thresholds on the output of a single magnetic sensing apparatus in order to yield a constant timing signal and special positional information for a mechanical apparatus. Several embodiments are disclosed which will yield this result.

It is a further object of the present invention to determine direction of target movement without reduction of encoding or timing information features on the target.

BRIEF DESCRIPTION OF THE DRAWINGS

The present invention will be more fully and completely understood from a reading of the Description of the Preferred Embodiment in conjunction with the drawings, in which.

DESCRIPTION OF THE PREFERRED EMBODIMENT

Figure 1:
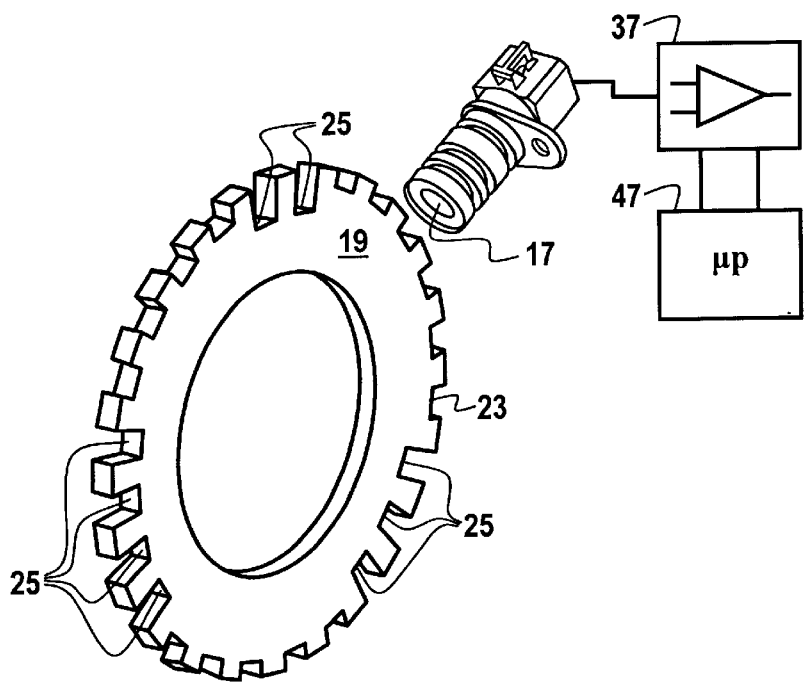
FIG. 1 is a partial illustration of a first embodiment of the present invention.

Throughout the Description of the Preferred Embodiment, like components will be identified by like reference numerals.

Figure 4:
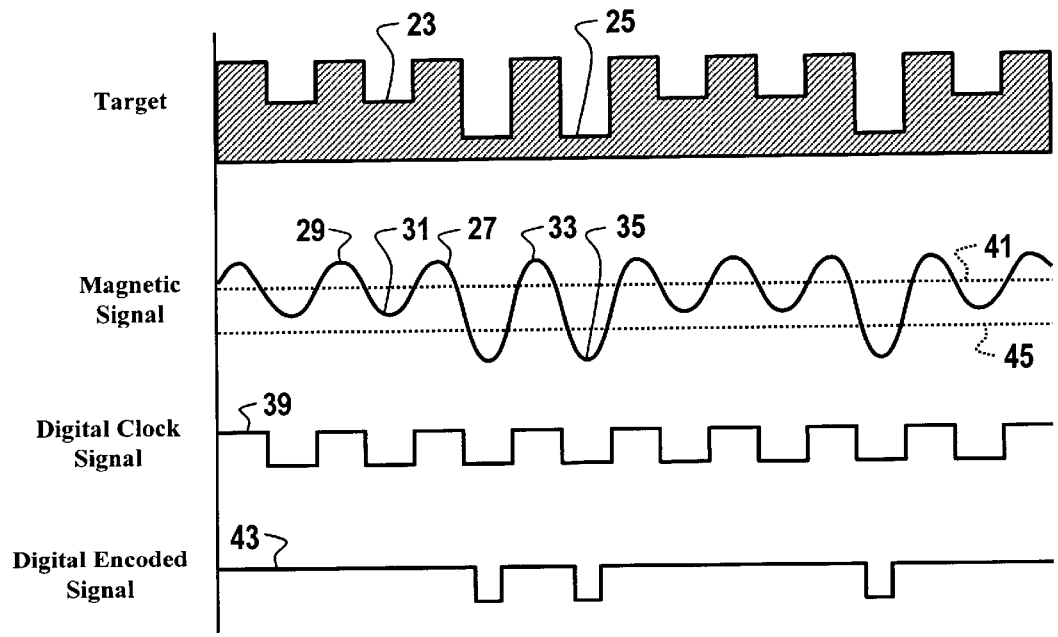
FIG. 4 is an illustration of the sensor output and electronic pulse train according to the sensing apparatus of the present invention corresponding to the embodiment of FIG. 1.

Referencing FIG. 1, a first embodiment of the present invention provides a regular single element magnetic effect sensor 17, such as a Hall effect sensor or magnetoresistive sensor, in any of various configurations or compositions. The geartooth target 19 is uniquely configured to provide a regular timing pulse and an encoded engine position pulse by providing varied slot depths between the target teeth. There are shallow slots 23 with deep slots 25 interspersed therein at encoded intervals. As seen in FIG. 4, the output 27, from the sensor 17, is a substantially sinusoidal wave with waves of a first magnitude 29 having troughs 31 corresponding to the shallow slots 23 and waves of a second magnitude 33 with second troughs 35 corresponding to deep slots 25. The sensing electronics, represented by, but not limited to, the comparator 37, then converts the sensor output wave 29 to a first digital pulse train 39 with a regular clocking pulse square wave function because each trough 31 in the pulse train triggers at a first higher threshold 41. A second digitally encoded pulse train 43 is emitted which contains only state changes at the deeper troughs 35 owing to a second, lower threshold 45 being set to trigger these pulses. These pulses are then passed on to the engine controller 47 which is a microprocessor based electronics package or the like. It will be appreciated that the comparator 37 may be a single unit or multiple units depending on the number of threshold and pulse trains desired. It will further be appreciated that additional electronic components such as amplifiers, inverters and the like may be utilized as necessary or desirable upon consideration by those having ordinary skill in the art. It will also be appreciated that the location of the components could be either on-board the sensor or outboard as deemed desirable and that the present invention may be implemented in analog or digital electronics or a combination of both.

Figure 2:
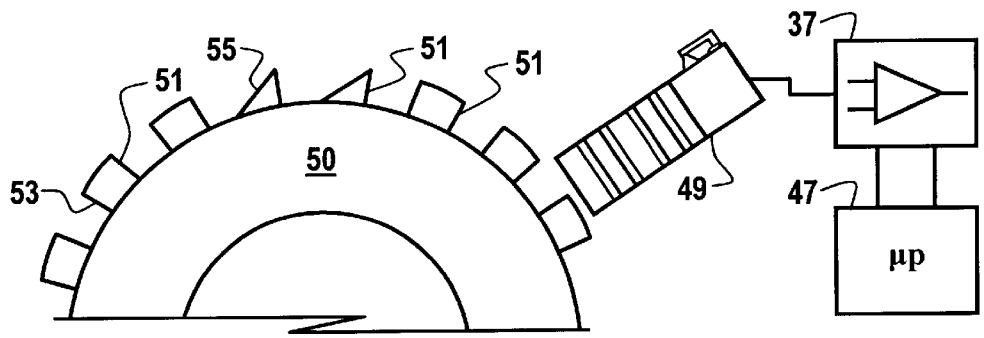
FIG. 2 is a partial illustration of a second embodiment of the present invention.
Figure 5:
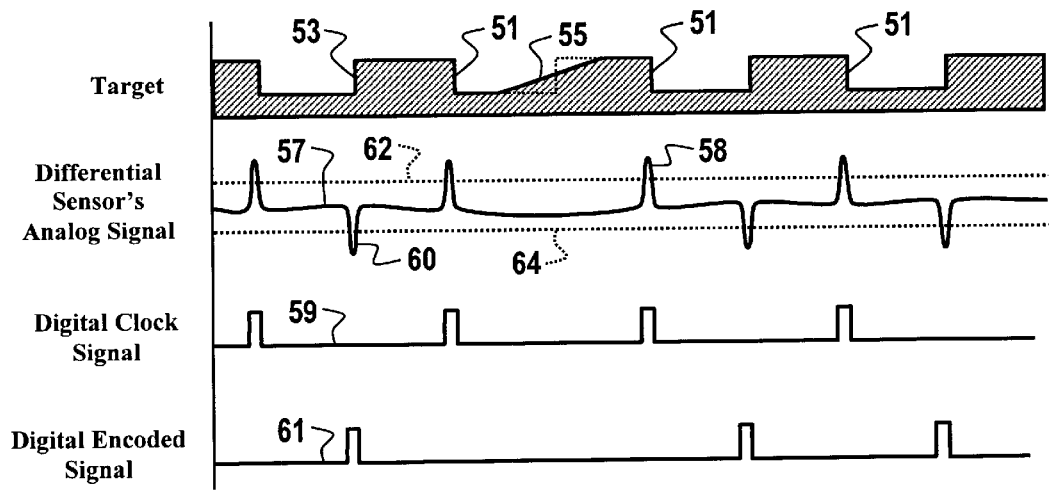
FIG. 5 is an illustration of the sensor output and electronic pulse train according to the sensing apparatus of the present invention corresponding to the embodiment of FIG. 2.

Referencing FIG. 2, a differential sensor 49, of the type having multiple sensing elements so as to detect slot to tooth transitions and tooth to slot transitions, communicates with controller 47 (similar to controller 47 illustrated in FIG. 1) and is aimed at the geartooth target 50. In the second embodiment of the present invention the regular spacing of the timing pulses is achieved by placing a high to low, or tooth to slot transition 51, as best seen in FIG. 5, at regular intervals throughout the circumference of the target 50. Normally, the slot to tooth transition is a sharp perpendicular low to high edge 53. But, in the case of encoded signals, the sharp leading edge 53 is substituted by a shallow ramp 55 for selected teeth which the differential sensor does not detect because of the gradual magnetic gradient. The sensor yields an output 57 of sharp positive going pulses 58 at the sharp tooth-to-slot transitions 51 and sharp negative going pulses 60 at the sharp slot-to-tooth transitions 53 and no pulses at the ramp features 55. A positive threshold 62 is set for the clock threshold and a negative threshold 64 for the encoded pulses, which occur only irregularly due to the substitution of ramp features for sharp slot-to-tooth features. The comparator 37 then produces a rhythmic or regular clock signal digital pulse 59. The sensing electronics or comparator may also generate an encoded signal 61 corresponding to the negative going pulse 60 as seen in FIG. 5.

It has been found in practice that the ramp features 55 may still be detected by the differential sensor owing to the difficulty in making the ramp so gradual as to produce an undetectable gradual gradient. However, the embodiment of FIGS. 2 and 5 may be practical in certain applications. For example, a circuit with a high-pass filter may be used to reject the ramp and only detect the tooth/slot edges.

Figure 3:
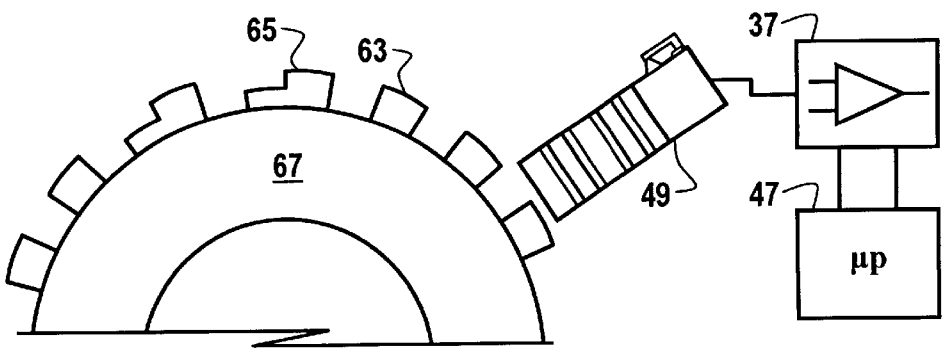
FIG. 3 is a partial illustration of a third embodiment of the present invention.
Figure 6:
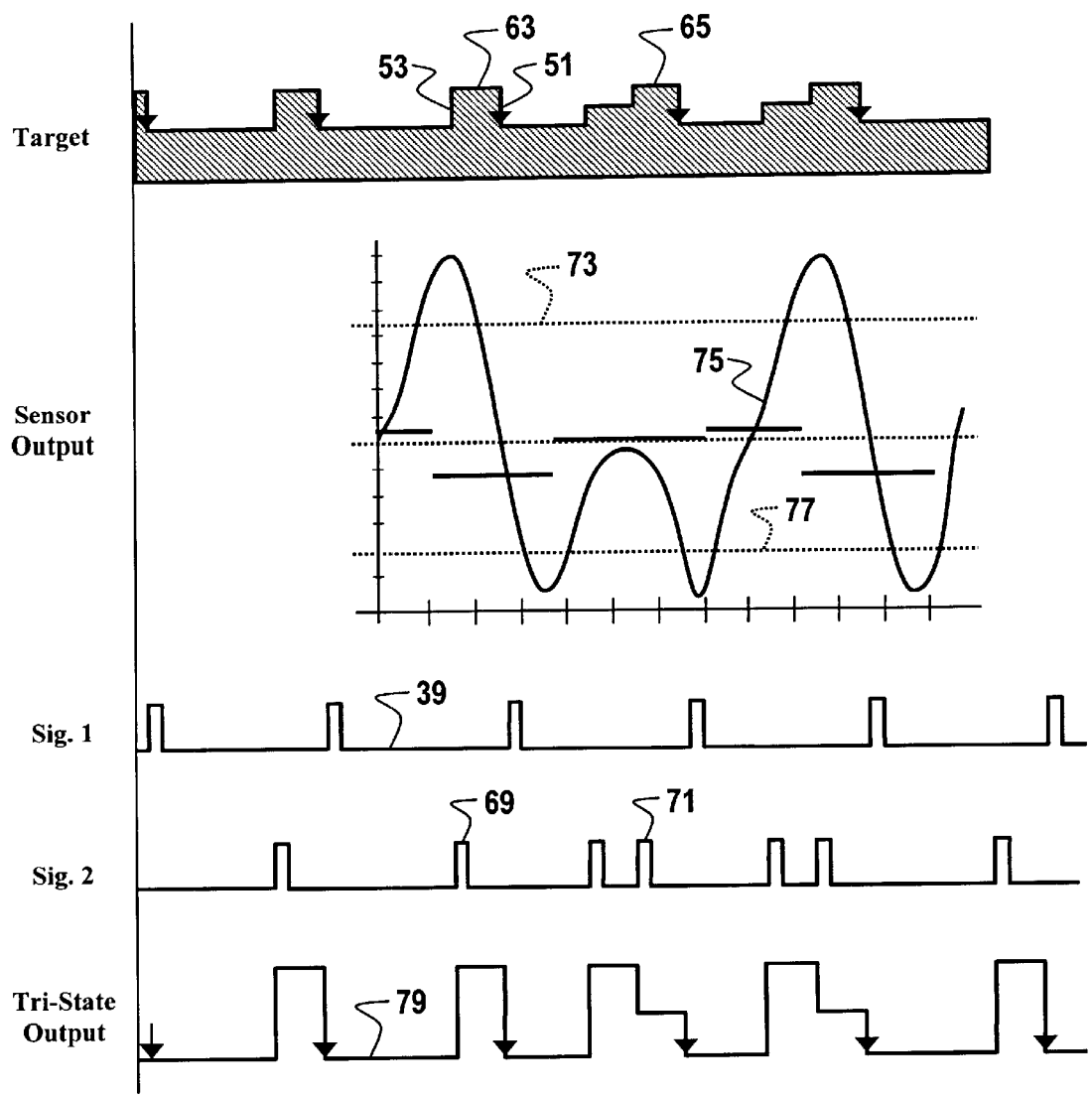
FIG. 6 is an illustration of the sensor output and electronic pulse train according to the sensing apparatus of the present invention corresponding to the embodiment of FIG. 3.

Referencing FIGS. 3 and 6, a differential magnetic sensor 49 is aimed at the geartooth target 67. In this third embodiment of the present invention, the topography of the target teeth is changed to have a regular tooth type 63 and a stepped tooth type 65. The tooth to slot transitions 51 are again placed at regular intervals to yield the timing pulse 39 by placing a first positive threshold 73 and a second negative threshold 77 on the sensor output 75. The slot-to-tooth transitions 53 of the first regular tooth type 63 will yield a single pulse 69 while the double "slot-to-tooth transitions", or low to high transitions of the step tooth type 65 will yield a double pulse 71. The microprocessor 47, by counting the double pulses is able to determine the encoded information. A tristate output 79 is shown to illustrate that the multiple output pulses from the two sensor thresholds may be combined on a single output line if deemed necessary. It will thus be appreciated that numerous thresholds may be utilized to yield multiple streams of information and that one or more output lines may be used to carry this information.

Also, the present invention can yield information on the direction of travel very quickly, in distinction to the known art target types. In the known targets, where feature length is changed to yield encoding; not all "bits", defined here as the passage of a tooth and its adjacent slot; are known to have the same tooth-to-slot ratio, i.e. yield the same duty cycle for the output pulse. Therefore, in the known art, a unique sequence of "bits" must be recognized by the controller to determine the direction of target movement. But, as seen in the present invention, because every bit is occupied by more slot than tooth, the controller needs only know the duty cycle information of one bit to determine direction of travel. And no encoding is sacrificed.

It will be appreciated that any number of various feature configurations may be used on the target object in conjunction with multiple thresholds to yield increased information from the sensing system described. As an example, multiple-stepped teeth beyond the tooth type shown could be added to yield multistate outputs as necessary for additional encoding or other control information dependent upon the resolution of the sensor and design constraints of the target wheel. Or, side by side target tracks on a single wheel or multiple wheels might also be used if the sensor output is appropriately designed to utilize the teachings of the present invention. Also, magnetic sensing implementations beyond the specific embodiments shown are contemplated. For example, a magnetic target having multiple magnetic signatures, such as a ring magnet incorporating different magnetic densities, are considered to be within the scope of the present invention. It will be appreciated by the ordinarily skilled artisan that, although shown herein as a function of voltage, the sensor output may operate as a function of current as well. Also, although the preferred embodiments utilize differential and single element sensors, the invention is not solimited but may be used with any variety of sensor element configuration, including but not limited to multiple element and bridge configurations.

Thus the present invention teaches how to get more control information without increasing target footprint, or decreasing timing information, from a target with multiple features and a single magnetic sensor by utilizing more than one threshold in converting the sensor output to pulse train information for yielding the control information. By following the teachings of the present invention presented herein, many embodiments of the present invention will occur to those persons having ordinary skill in the art.

While the present invention has been shown and described with reference to preferred embodiments, many alternatives will become apparent to the ordinarily skilled artisan upon disclosure of the present invention. Therefore the present invention is only to be limited by the claims appended hereto.

Having thus described the invention what is claimed is:

1. An automotive geartooth sensor comprising:
   a) a single magnetic sensor for sensing a plurality of target features; and
   b) a target adjacent to the sensor, the target having first shaped features spaced for inducing the sensor to exhibit a first pulse train, and second shaped features incorporated among the first features for inducing the sensor to exhibit a second pulse train, the first shaped features having a first depth on the geartooth, the second shaped features having at least a second depth on the geartooth, the first pulse train corresponding to the first depth, the second pulse train corresponding to the at least second depth.

2. The sensor according to claim 1, further comprising: electronics in communication with the sensor and being sensitive to a plurality of magnetic thresholds for outputting multiple pulse trains, the multiple pulse trains corresponding to the plurality of target features.

3. The sensor according to claim 2 wherein;
   the multiple pulse trains are combined into a single multi-state pulse train.

4. The automotive geartooth sensor according to claim 1 wherein;
   each first shaped feature and each second shaped feature has a corresponding high to low transition and a low to high transition;
   the sensor is a differential sensor for detecting each target feature's high to low transitions and generating a first output corresponding to each high to low transition, and each target feature's low to high transitions and generating a second output corresponding to each low to high transition.

5. The geartooth sensor according to claim 4 wherein;
   each first shaped feature includes a sharp transition and each second shaped feature includes at least one non-sharp transition.

6. The geartooth sensor according to claim 5 wherein;
   the second feature transitions induce no output from the sensor corresponding to each non-sharp transition and the first feature transitions induce an output from the sensor corresponding to each sharp transition.

7. The geartooth sensor according to claim 6 wherein;
   the geartooth further comprises electronics having a first threshold and a second threshold for converting the magnetic effect sensor output to the first and second pulse trains.

8. The geartooth sensor according to claim 7 wherein;
   the electronics include an A to D converter.

9. The geartooth sensor according to claim 7 wherein;
   the sensor outputs a timing signal corresponding to the sensing of each first shaped feature and each second shaped feature.

10. The geartooth sensor according to claim 7 wherein;
    the sensor outputs a synchronization signal corresponding to the sensing of each second shaped feature.

11. The geartooth sensor according to claim 7 wherein;
    the differential sensor is configured to output a direction signal corresponding to a rotational direction of the target.

12. The geartooth sensor according to claim 7 wherein;
    the first outputs are timing outputs for misfire detection.

13. The geartooth sensor according to claim 7 wherein;
    the second outputs are encoded for detection of absolute engine position.

14. The geartooth sensor of claim 4 wherein the multiple pulse trains further comprise at least two pulse trains.

15. A magnetic effect sensor target comprising:
    a) a target having first features spaced at intervals for inducing a single magnetic sensor to exhibit a first pulse train, the first features having at least one first transition which induces an output on a sensor; and
    b) second features incorporated among the first features for inducing the single magnetic sensor to exhibit a second pulse train, the second features having at least one second transition which does not induce an output on the sensor, the first features having a first depth on the target, the second features having at least a second depth on the target, the first pulse train corresponding to the first depth and the second pulse train corresponding to the at least second depth.

16. A geartooth sensor system comprising:
    a) a rotatable target having first shaped features and second shaped features interspersed on the target; and
    b) a sensor adjacent to the target for sensing the first shaped and second shaped features, the first shaped feature having at least one first transition edge, the second shaped feature having at least one second transition edge, the sensor generating at least a first signal when sensing the first transition edge, the sensor generating at least a second signal when sensing the second transition edge.

17. The system of claim 16, the first shaped feature having a first positive edge and a first negative edge, the second shaped feature having a second positive edge and a second negative edge, the sensor generating the first signal in response to the first negative edge, the sensor generating the second signal in response to the second positive edge.

18. The system of claim 17, each first positive edge comprising a low to high transition, each first negative edge comprising a high to low transition, each second positive edge comprising at least one low to high transition and each second negative edge comprising a high to low transition.

19. The system of claim 18, the sensor failing to produce the second signal when each second positive edge is detected.

20. The system of claim 19, each second positive edge being stepped.

21. The system of claim 19, each second positive edge having a gradual magnetic gradient.

22. The system of claim 21, the first shaped features and the second shaped features interspersed circumferentially about the target.

23. The system of claim 22 further comprising electronics in communication with the sensor, the electronics configured to generate at least one pulse train at a predetermined threshold in response to the sensing of each first shaped feature and each second shaped feature.

24. The system of claim 23 wherein the sensor is a differential sensor, the differential sensor configured to detect each high to low transition and each low to high transition as the target rotates in a specified direction.

25. The system of claim 24, the sensor generating a synchronization signal corresponding to the sensing of each second shaped feature.

26. The system of claim 25, the sensor generating an encoded signal in response to detection of the first positive edge.

* * * * *